Figure 13:
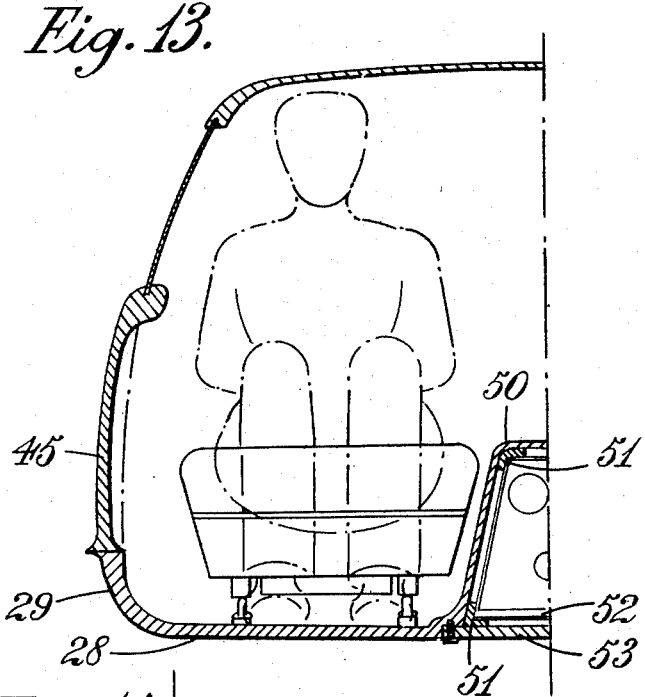

Oct. 7, 1952     D. E. HOBBS     2,612,964
CHASSIS FRAME FOR ROAD VEHICLES
Filed Feb. 6, 1950     5 Sheets-Sheet 1
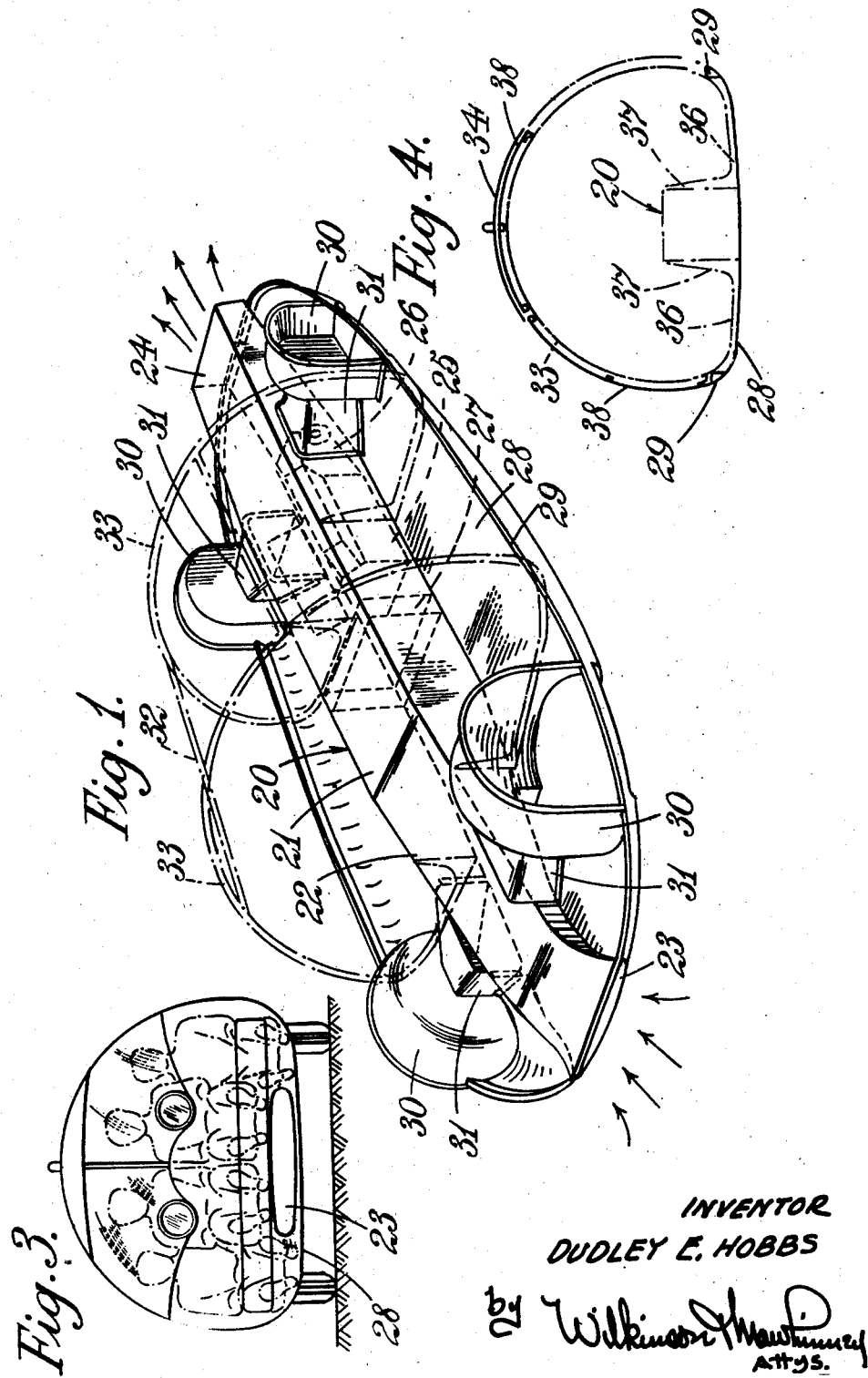
INVENTOR
DUDLEY E. HOBBS Oct. 7, 1952
D. E. HOBBS
2,612,964
CHASSIS FRAME FOR ROAD VEHICLES
Filed Feb. 6, 1950
5 Sheets-Sheet 2
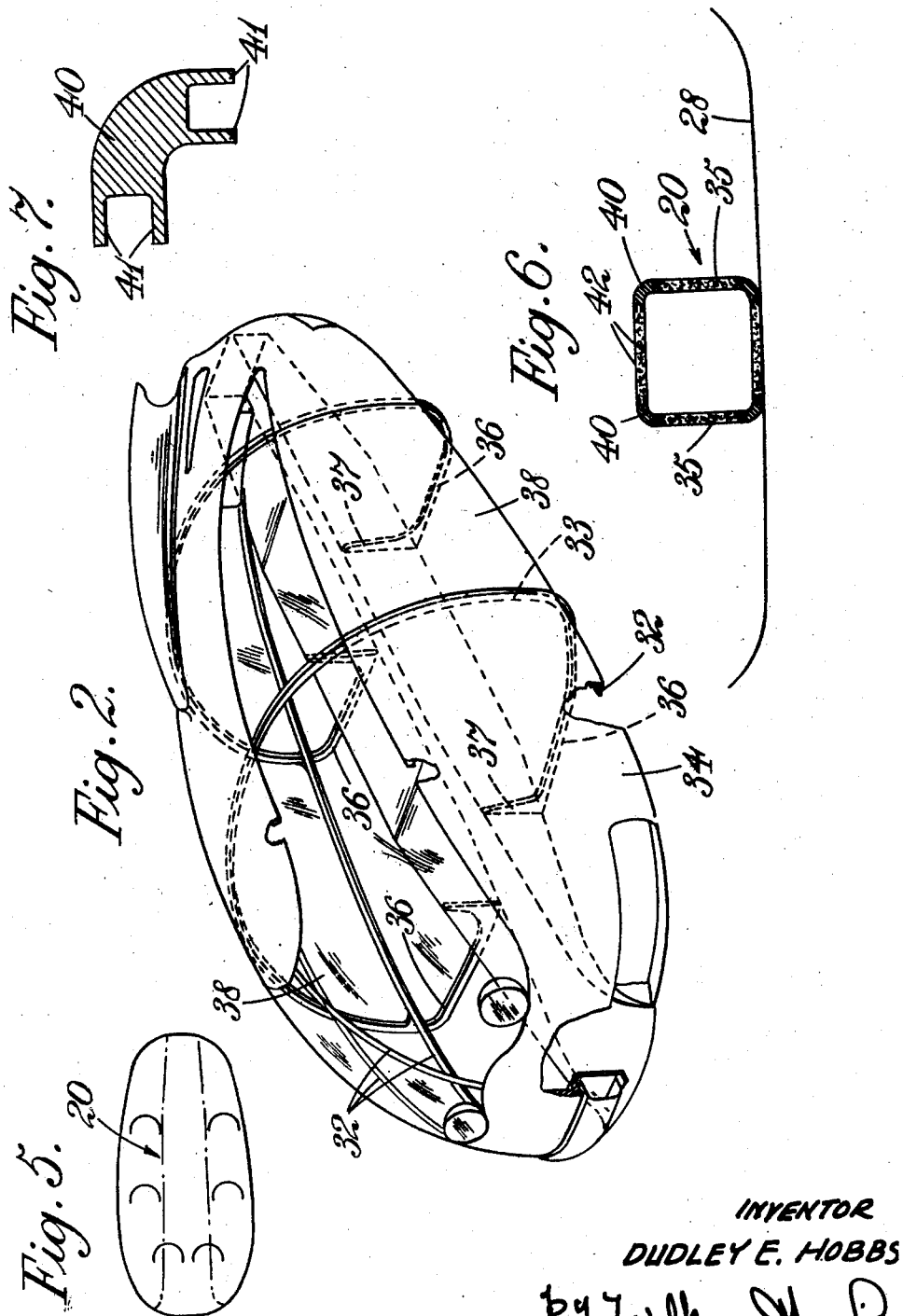
INVENTOR
DUDLEY E. HOBBS
by Wilkinson Mawhinney
Attys.

Oct. 7, 1952     D. E. HOBBS     2,612,964
CHASSIS FRAME FOR ROAD VEHICLES
Filed Feb. 6, 1950     5 Sheets-Sheet 3
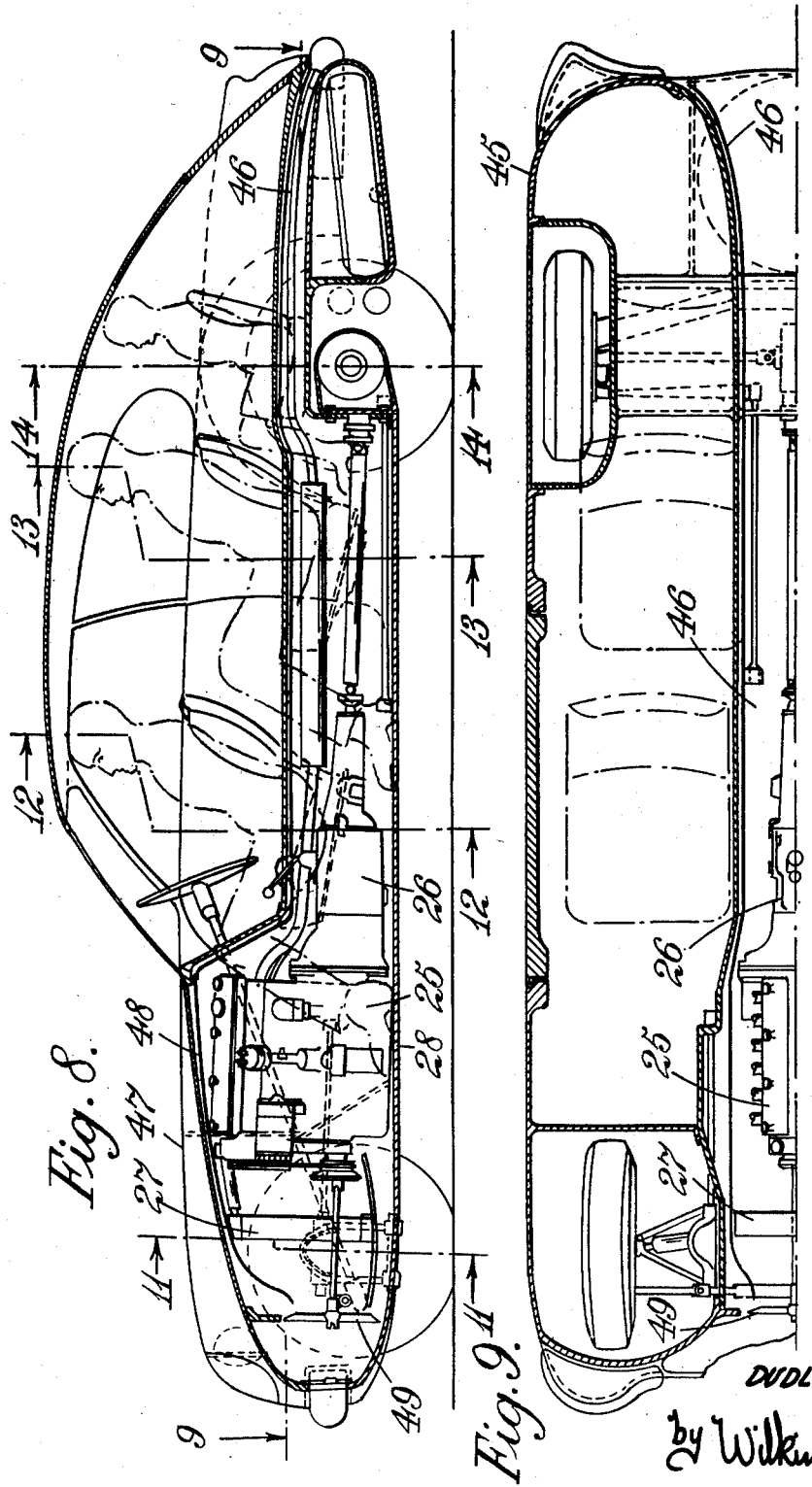
INVENTOR
DUDLEY E. HOBBS Oct. 7, 1952 D. E. HOBBS 2,612,964
CHASSIS FRAME FOR ROAD VEHICLES
Filed Feb. 6, 1950 5 Sheets-Sheet 4
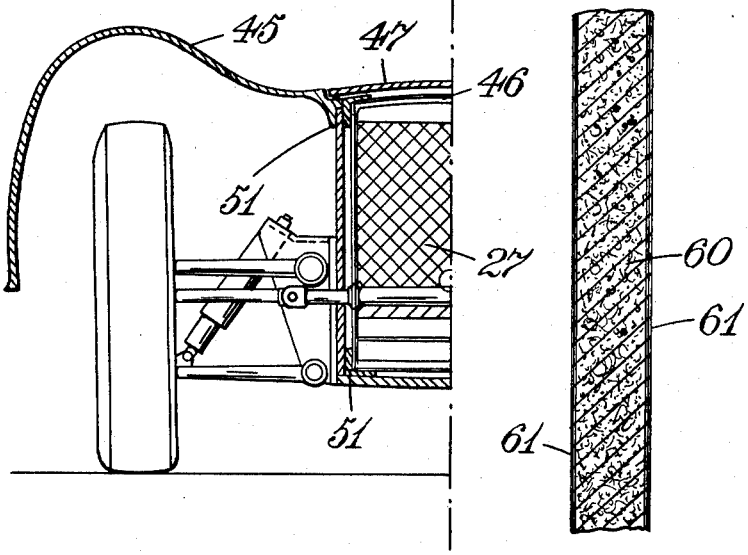
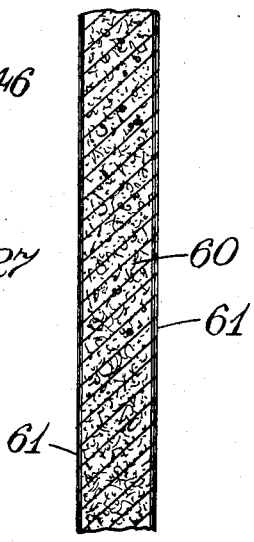
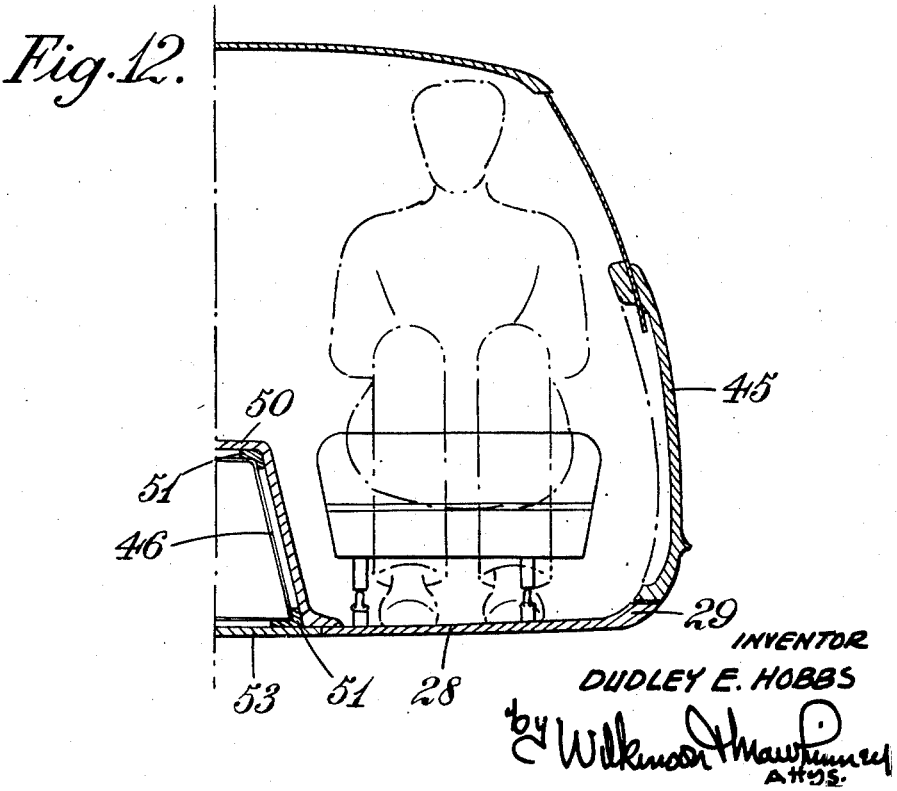
INVENTOR
DUDLEY E. HOBBS
by Wilkinson Mawhinney
ATTYS.

Oct. 7, 1952  D. E. HOBBS  2,612,964
CHASSIS FRAME FOR ROAD VEHICLES
Filed Feb. 6, 1950  5 Sheets-Sheet 5

INVENTOR
DUDLEY E. HOBBS

Patented Oct. 7, 1952

2,612,964

UNITED STATES PATENT OFFICE 2,612,964

CHASSIS FRAME FOR ROAD VEHICLES

Dudley Edwin Hobbs, Bristol, England, assignor to The Bristol Aeroplane Company Limited, Bristol, England, a British company Application February 6, 1950, Serial No. 142,645
In Great Britain February 17, 1949

1 Claim. (Cl. 180—54)

This invention concerns road vehicles, more particularly motor cars and has for its object to provide an improved construction of chassis frame therefor.

More particularly, this invention has for its object the provision of a chassis frame of relatively large cross-sectional size to give the frame rigidity and torsional stiffness, the space within the frame being utilized so that the size of the vehicle is consequently not greatly increased, if at all.

It is another object of the present invention to provide that the engine and the main transmission to the road wheels be mounted within an open ended tubular member through which air passes for cooling, carburation and to carry the exhaust gases away.

According to the present invention a chassis frame for a road vehicle comprises a longitudinal structural member which is hollow and arranged to receive within it the engine and the main transmission to the road wheels.

According to a feature of the present invention the structural member is an open ended tube which receives, at one end, air for cooling, carburation and so on and delivers, from the other end, the heated air and exhaust gases from the engine.

It is preferred that the tube be rectangular in cross-section and comprises longitudinal corner members and wall panels removably secured thereto. Each wall panel may comprise inner and outer plates which are spaced apart to receive a sound and/or heat insulating material between them. Air may be circulated through the space between the plates.

According to another feature of the present invention the structural member is of channel section. It is preferred that the open side of the channel member be closed by a cover plate.

According to yet a further feature of the present invention, a motor vehicle comprises a chassis frame as above set forth, a floor unit constituting the undersurface of the vehicle secured to the chassis frame and a body shell secured to the floor unit.

According to a further feature, the body shell, which is part-circular in cross-section, carries a plurality of part-circular members spaced apart lengthwise of the vehicle and each having inwardly directed ends which are attached to the chassis frame, the doors of the vehicle being supported between adjacent pairs of said members for sliding movement along the members.

Figure 14:
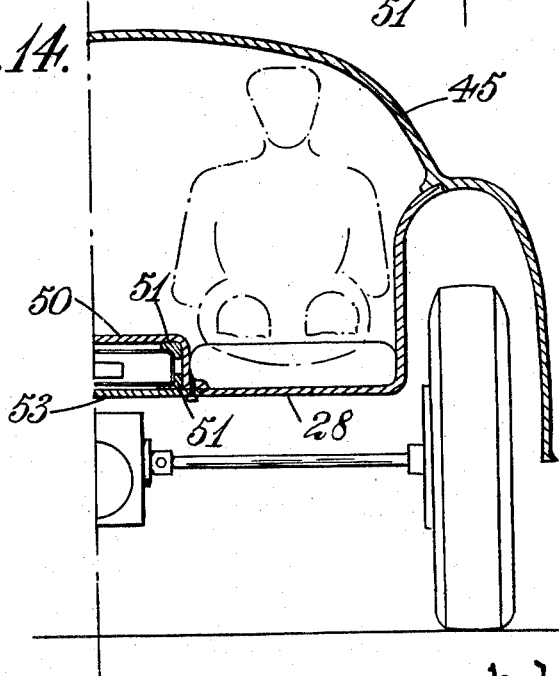

Two practical applications of the present invention will now be described, by way of example only, with reference to the accompanying drawings whereof, Figure 1 is a perspective view of a chassis frame in accordance with the present invention showing a floor unit attached thereto, Figure 2 is a perspective view of a body which is adapted to be placed on the floor unit of Figure 1, Figure 3 is a front view of a motor car obtained by asembling the parts of Figures 1 and 2, Figure 4 is a diagrammatic transverse section of the motor car of Figure 3 showing certain details of the body and of the vehicle doors, Figure 5 is a diagrammatic plan view of the motor car of Figures 1 to 4 showing the seating arrangements, Figure 6 is a transverse cross-section of the chassis frame of Figure 1, Figure 7 is a detail to an enlarged size of the chassis frame of Figure 6, Figure 8 is a sectional elevation of a motor car showing the second application of the present invention, Figure 9 is a section on the line 9—9 of Figure 8, Figure 10 is a scrap sectional view showing a detail of the construction of the motor car of Figure 8, and Figures 11 to 14 respectively are half-sections on the lines 11—11, 12—12, 13—13 and 14—14 of Figure 8.

Referring to Figures 1 and 2: the chassis frame, which is generally indicated by the reference numeral 20, is rectangular in cross-section and extends over the length of the car. A central portion 21 of the frame 20 is square in cross-section while the front portion 22 tapers towards an elliptical opening 23 which is flush with the bodywork at the front of the car (see Figure 1). The rear portion 24 is rectangular throughout its length but tapers towards the end which is also open.

The engine 25, gear box 26 and radiator 27 are all housed within the central part 21 of the chassis frame. Air for the radiator 27, for the carburettor, for cooling the exhaust and so on enters the elliptical opening 23 and flows along the entire length of the frame 20. The air after use is discharged with the engine exhaust gases through the opening in the rear portion 24.

The engine 25 is of the conventional reciprocating-piston type but it will be appreciated that other forms of power plant may be used such, for example, as a gas-turbine engine. The gas-turbine engine would be mounted within the chassis frame 20 and suitably geared to drive the front and/or rear wheels. When a gas-turbine engine is provided it may be possible to dispense with the gear box and where a two-rotor turbine system is used the conventional differential mechanism for driving the road wheels may not be necessary.

In any case, the front wheels are supported by independent suspensions from the front portion 22 of the frame 20 and the rear wheels are supported from the rear portion 24 thereof. The gear box 26 is connected with the rear wheels by a differential and back axle in known manner. As shown in Figure 1 the engine and main parts of the transmission to the road wheels lie within the wheel base.

Referring again to Figure 1: the floor 28 of the vehicle is in one piece which is suitably attached to the undersurface of the chassis frame 20. The floor 28 being in one piece protects all parts of the vehicle from ingress of dirt and water. The peripheral edge of the floor unit 28 is upturned and locally thickened, as at 29. The local thickening extends wholly around the vehicle.

Since the floor unit 28 constitutes the undersurface of the vehicle the road wheels will pass through the floor. Accordingly mudguards 30 are mounted on the floor unit so as to enclose the wheels. Each mudguard 30 communicates with a tunnel 31 which extends towards the chassis frame 20. The front wheel suspensions lie within the front tunnels 31 and the rear tunnels 31 accommodate the back axle.

Figure 2 shows the body which is adapted to be placed on, and secured to the floor unit 28. The body comprises longitudinal frame members 32 and a pair of semi-circular transverse members 33 secured thereto. The members 32, 33 carry the body panels 34. The members 33 have inwardly directed ends 36 which are attached at 37, to the chassis frame 20. One member 33 lies just behind the front wheels and the other member is immediately in front of the rear wheels.

The inwardly directed ends 36 are approximately on a plane with the lower surface of the chassis frame 20 and the floor unit 28 is attached to these ends.

A door 38 is provided on each side of the vehicle the door being curved to the same curvature as the members 33. The members 33 are of channel section and receive the doors between them, each door being adapted to slide independently along the members. The doors when closed rest on the edge 29 of the floor unit 28. The doors may be raised from inside or outside the vehicle towards the top thereof as shown in Figure 4. It may be arranged that either or both doors can be opened at the same time.

A feature of the body construction described is that the hooped frame members 33 provide a strong structure and effectively protect the occupants of the car should it turn over as a result of accident.

The preferred construction of chassis frame is shown in Figures 6 and 7 to which reference will now be made.

The central portion 21 of the frame 20 comprises four longitudinal, corner members 40 which are generally L-shaped. Each leg of a member 40 has a pair of spaced lugs 41 and it is arranged that panels 42 are attached to the members 40 so as to form the rectangular tubular frame referred to above. The inner and outer panels 42 are respectively attached to the inner and outer lugs of the corner pieces 40 and the space between the plates is preferably filled with a sound and/or heat insulating material 35. Alternatively air may be circulated between the panels 42 so as to cool the chassis frame and this air may be used in the engine—for example, for carburation. The panels 42 are suitably connected together so as to prevent drumming due to vibration.

From the above description it is clear that, the chassis frame 20 passes through the body of the vehicle above the level of the floor unit 28. The front portion 22 of the frame 20 is of continuously decreasing height and, as shown in Figures 3 and 5, two seats are provided side by side on top of this part of the frame. The seats are for the driver and one passenger. A further two seats are provided on each side of the frame 20 so that a further four passengers may be carried—the seats rest on the floor unit 28. The top of the frame 20 may conveniently form a table passing centrally through the body of the vehicle. The four seats which rest on the floor unit 28 are preferably of the swivelling type so that the passengers may turn the seat around to make full use of the chassis as a table. The driver and one passenger are seated well forward of the vehicle—in the construction being described they are approximately over the front axle—so that an excellent field of vision is obtained due to the very large transparent surfaces which constitute the window (see Figure 2).

The tubular chassis frame which houses the engine and the main transmission being open at one end to receive a stream of air and at the other end to discharge the heated air and the exhaust gases, ensures that an adequate stream of air is available for the engine and for cooling and that obnoxious fumes and gases are carried away from the vehicle since air flows straight through the chassis frame.

The second embodiment of the present invention shown in Figures 8 to 14 will now be described.

Referring to Figures 8 and 9: the motor vehicle comprises a one-piece floor unit 28 having an upturned edge 29, a one-piece body 45 which rests on, and is suitably attached to, the floor unit and a chassis frame 46. The chassis frame 46 is of inverted channel form and extends substantially over the length of the vehicle. Beneath the bonnet 47 the chassis frame is enlarged as at 48 to accommodate the engine 25 and radiator 27. The gear box 26 is carried in conventional manner by the engine and lies, with the rest of the main transmission, within the channel frame. The forward end of the chassis frame 46 is open and in the opening there is a fan 49 which is driven by the engine. The fan forces air through the frame 46.

The chassis frame 46 is received by a tunnel 50 which forms an integral part of the floor unit 28. The lower part of the tunnel 50 is open. The wall panels of the chassis frame 46 are secured to longitudinal corner members 51 and there are a plurality of bracing members 52 which connect the lower edges of the inverted channel frame together. The frame 45 and tunnel 50 are conveniently secured together. In this way a rigid chassis frame is provided. The tunnel 50 is closed by plates 53 which are secured to the floor unit 28. To gain access to the engine and the main transmission it is only necessary to remove one or more of the plates 53—the tie members 52 do not prevent ready access.

As in the arrangement first described, the wheels are enclosed by mudguards. In the vehicle shown in Figures 8 and 9 the mudguards associated with the front wheels are carried by the body and the mudguards associated with the rear wheels by the floor unit but this is only a matter of convenience in the present design and may obviously be departed from.

As in the first construction described the passenger seats are arranged on each side of the chassis frame. In this construction also the driver is placed to the side of the frame.

With either of the constructions described the body unit and the floor unit may have walls made from a sandwich material comprising any type of thin sheeting 61 (veneer, plywood, metal, plastic, glass cloth, glass fibre, cotton, canvas or other fabric) permanently attached, by bonding or otherwise, to a light-weight fibrous core 60—such as of expanded ebonite (Figure 10). If necessary the sandwich is impregnated with a synthetic resin and cured (Figure 10). The cost of the body and of the floor unit when manufactured in this way is relatively small and, furthermore, it enables coloured resins to be used so that subsequent painting of the body is not necessary. Another advantage of using a body and floor unit constructed as described is that it enables parts to be permanently and simply joined thereto under heat and pressure. The heat may be locally applied by high frequency currents. When the body and floor unit are made in this way the abutting edges may be permanently united by heat and pressure. Alternatively, they may be permanently united by suitable adhesive. In a further alternative the body unit may be bolted to the floor unit for which purpose the units, during moulding, are made with attachment bolts and brackets.

I claim:

A motor vehicle comprising an open-ended tunnel-like chassis member which extends lengthwise of the vehicle and is of channel section the open face of which faces downwardly, an engine to drive the vehicle arranged within the chassis member, means for supporting the road wheels from the chassis, a main transmission from the engine to a differential gear box all within the chassis member, transmission means transversely of the chassis member from said differential gear to at least one pair of road wheels, a substantially flat floor unit having an upturned marginal edge, said floor unit being attached to the chassis member substantially throughout the length of the chassis member, a body shell secured to the upturned peripheral edge of the floor unit, a central longitudinal tunnel on said floor unit having an open bottom and within which said chassis member is mounted, and a cover plate on said floor unit for closing the tunnel and the chassis member.

DUDLEY EDWIN HOBBS.

REFERENCES CITED

The following references are of record in the file of this patent:

UNITED STATES PATENTS

| Number | Name | Date |
| --- | --- | --- |
| 862,250 | Herman | Aug. 6, 1907 |
| 1,560,351 | Seidel | Nov. 3, 1925 |
| 1,648,505 | Persu | Nov. 8, 1927 |
| 1,934,385 | Strauss | Nov. 7, 1933 |
| 2,216,670 | Klavik | Oct. 1, 1940 |
| 2,373,356 | Thoms et al. | Apr. 10, 1945 |
| 2,527,487 | Paton | Oct. 24, 1950 |

FOREIGN PATENTS

| Number | Country | Date |
| --- | --- | --- |
| 236,833 | Great Britain | July 16, 1925 |
| 865,508 | France | Feb. 24, 1941 |